(12) United States Patent
Chen et al.

(10) Patent No.: US 11,874,556 B1
(45) Date of Patent: Jan. 16, 2024

(54) DIRECTIONAL LIQUID CRYSTAL DISPLAY

(71) Applicant: LIQXTAL TECHNOLOGY INC., Tainan (TW)

(72) Inventors: Hung-Shan Chen, Tainan (TW); Sung-Nan Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 18/135,180

(22) Filed: Apr. 16, 2023

(51) Int. Cl.
*G02F 1/1335* (2006.01)

(52) U.S. Cl.
CPC .............................. *G02F 1/133607* (2021.01)

(58) Field of Classification Search
CPC ................................................. G02F 1/133607
See application file for complete search history.

(56) References Cited

U.S. PATENT DOCUMENTS

| | | | |
|---|---|---|---|
| 5,280,371 A * | 1/1994 | McCartney, Jr. | G02F 1/133604 349/95 |
| 8,408,775 B1 * | 4/2013 | Coleman | G02F 1/133526 362/616 |
| 2007/0222916 A1 * | 9/2007 | Kohara | G02B 6/0071 359/833 |
| 2021/0318480 A1 * | 10/2021 | Hong | G03H 1/2294 |

FOREIGN PATENT DOCUMENTS

| | | | | |
|---|---|---|---|---|
| WO | WO-2005071474 A2 * | 8/2005 | ......... | G02B 27/2214 |
| WO | WO-2007002317 A1 * | 1/2007 | ........... | G02B 5/0226 |
| WO | WO-2007026986 A1 * | 3/2007 | ........... | G02B 6/0053 |
| WO | WO-2018185476 A1 * | 10/2018 | ......... | G02B 19/0028 |
| WO | WO-2021018024 A1 * | 2/2021 | ........... | G02B 6/0036 |

* cited by examiner

*Primary Examiner* — Mary Ellen Bowman
(74) *Attorney, Agent, or Firm* — Winston Hsu

(57) ABSTRACT

A directional liquid crystal display, capable of suppressing Moiré patterns, includes a liquid crystal display module; a backlight module with a small divergence angle, for emitting light toward the liquid crystal display module, wherein a full width at half maximum (FWHM) of light energy distribution of the backlight module is less than 50 degrees; and a light directivity module, disposed between the backlight module and the liquid crystal display module.

13 Claims, 3 Drawing Sheets

DIRECTIONAL LIQUID CRYSTAL DISPLAY

BACKGROUND OF THE INVENTION

1. Field of the Invention

The present invention relates to a directional liquid crystal display, and more particularly, to a directional liquid crystal display capable of suppressing Moiré patterns.

2. Description of the Prior Art

The liquid crystal display (LCD) has many special applications that require limited viewing angles, such as privacy and vehicle directional displays to avoid interfering with driving. Therefore, LCDs use various optical modules that are spatially periodic structured and direct light in specific directions. However, these optical modules often cause interference fringes, known as Moiré patterns, which affect the clarity of the image. To eliminate Moiré patterns, designers have to sacrifice optimized design parameters of the optical modules, or increase the distance between them.

Under these circumstances, designing directional LCD capable of suppressing Moiré patterns has become one of the goals in the industry.

SUMMARY OF THE INVENTION

The present invention is to provide a directional liquid crystal display to solve the above problems.

The present invention provides a directional liquid crystal display, capable of suppressing Moiré patterns, comprising a liquid crystal display module; a backlight module with a small divergence angle, for emitting light toward the liquid crystal display module, wherein a full width at half maximum (FWHM) of light energy distribution of the backlight module is less than 50 degrees; and a light directivity module, disposed between the backlight module and the liquid crystal display module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
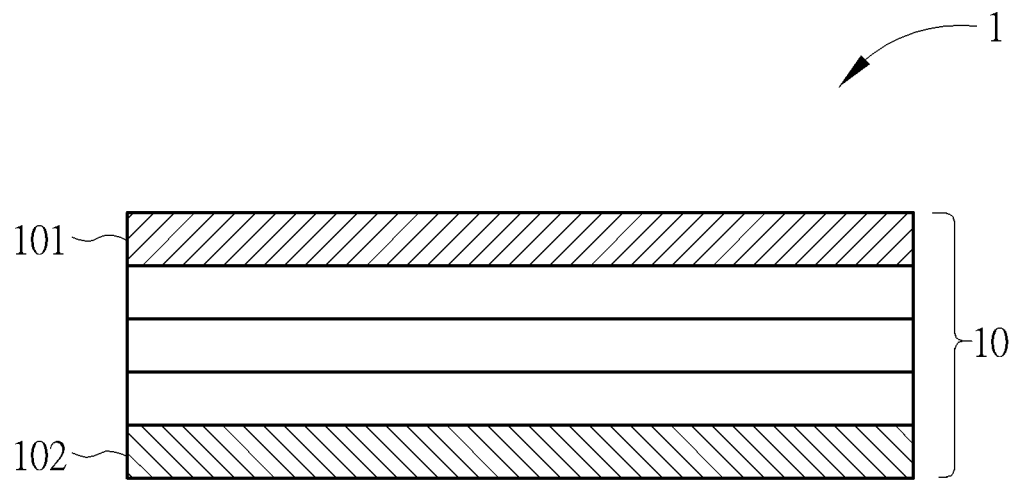
FIG. 1 is a schematic diagram of a directional liquid crystal display according to an embodiment of the present invention.

Please refer to FIG. 1. FIG. 1 is a schematic diagram of a directional liquid crystal display (LCD) 1 according to an embodiment of the present invention. The directional LCD 1 is equipped with at least two optical modules 10, including an LCD module 101 and a backlight module 102 that emits light toward the LCD module 101. To meet limited viewing angle requirements, the backlight module 102 is specifically designed with a small divergence angle, and a full width at half maximum (FWHM) of light energy distribution of the backlight module 102 is less than 50 degrees. For example, the backlight module 102 may include a direct back-lit backlight module and a condenser lens module. The condenser lens module gathers the parallel light generated by the back-lit backlight module and convers the gathered light into light with the small divergence angle. Alternatively, the backlight module 102 may include a direct back-lit backlight module and one of a privacy film module, a viewing control film module or a liquid crystal angular attenuator filter. In each example, the parallel light passes through the privacy film, the viewing control film module or the liquid crystal angular attenuator filter and emerges as light with the small divergence angle. In this circumstance, both the LCD module 101 and the backlight module 102 are spatially periodic optical elements to confine or deflect lights in specific directions. However, the LCD module 101 and the backlight module 102 may result in Moiré patterns that affect visual comfort.

To address the shortcomings of the directional LCD 1, the present invention includes a light directional module that is positioned between the LCD module 101 and the backlight module 102 to eliminate or suppress Moiré patterns.

Figure 2:
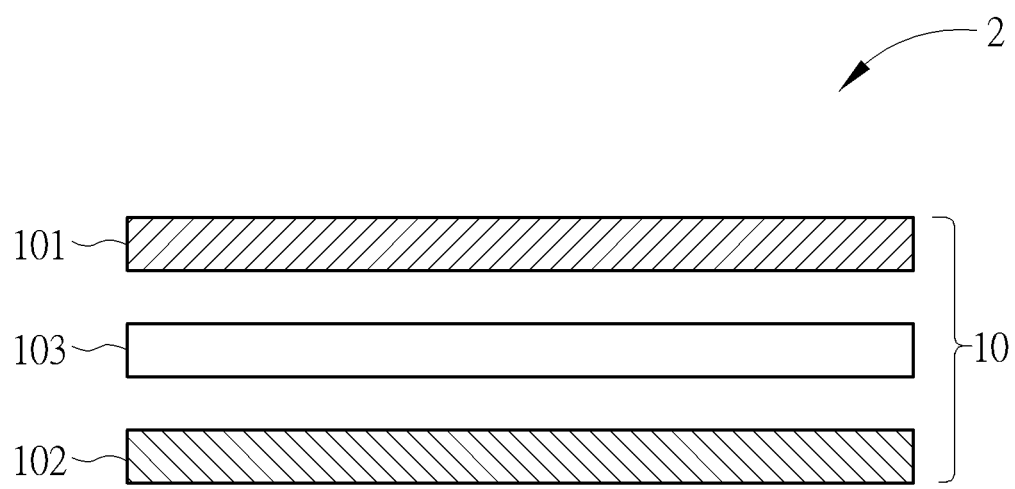
FIG. 2 is a schematic diagram of a directional liquid crystal display according to an embodiment of the present invention.

In detail, please refer to FIG. 2. FIG. 2 is a schematic diagram of a directional LCD 2 according to an embodiment of the present invention. The directional LCD 2, along with subsequent variations described, are derived from the directional LCD 1 and share the same component symbols. The primary difference between the directional LCD 1 and the directional LCD 2 is the addition of a light directional module 103, which is disposed between the LCD module 101 and the backlight module 102. The light directional module 103 may be a spatially periodic optical module with a periodic structure on a scale of light wavelength, designed to suppress interference fringes or Moiré patterns. More specifically, one side of the light directional module 103, adjacent to the backlight module 102, has spatial periodicity, while the other side of the light directional module 103, adjacent to the LCD module 101, exhibits diffuser characteristics. The periodicity of light is scattered after the light passes through the light directional module 103. As a result of the above design, the light directional module 103 effectively suppresses or eliminates Moiré patterns from the directional LCD 2. It should be noted that a haze effect (HAZE) of the diffuser characteristics should be less than 30%. Alternatively, the light directional module 103 may also be a spatially aperiodic optical module, which does not produce interference fringes or Moiré patterns that would negatively impact visual comfort.

Figure 3:
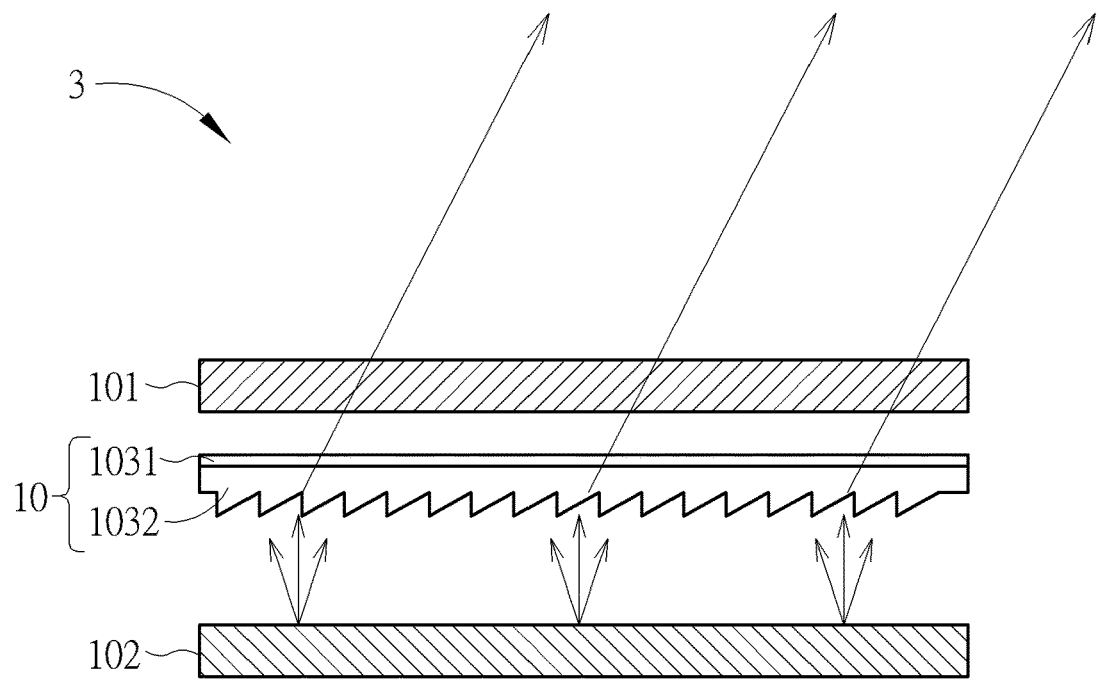
FIGS. 3 and 4 are schematic diagrams of directional liquid crystal displays according to embodiments of the present invention.
Figure 4:
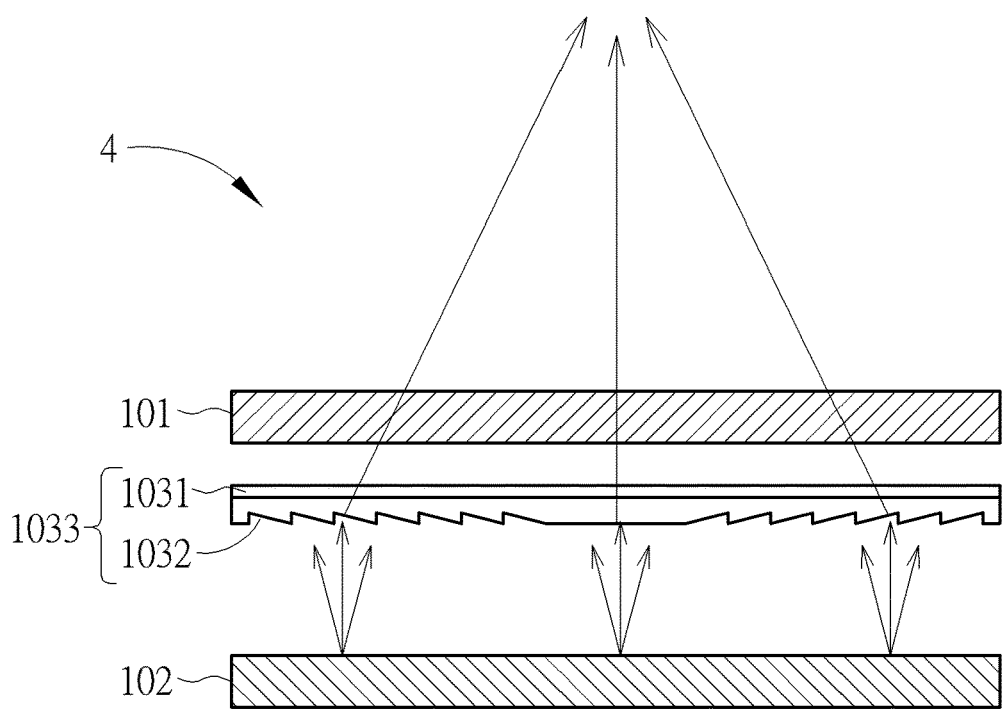

In an embodiment, please refer to FIG. 3 and FIG. 4. FIGS. 3 and 4 are schematic diagrams of directional LCDs 3 and 4, respectively, according to embodiments of the present invention. The light directional modules 103 of the directional LCDs 3 and 4 are the spatially periodic optical modules with a periodic structure on a scale of light wavelength. As shown in FIG. 3, the light directional module 103 of the directional LCD 3 includes a diffuser 1031 and a micro-prism array 1032 with a spatially periodic arrangement structure. Once the light with the small divergence angle passes through the light directional module 103, the light is transmitted in a specific direction. On the other hand, as shown in FIG. 4, the light directional module 103 of the directional LCD 4 includes the diffuser 1031 and a Fresnel lens 1033. Specifically, the diffuser 1031 is adjacent to the liquid crystal module 101, while the micro-prism array 1032 or the Fresnel lens 1033 is adjacent to the backlight module 102. Because both the backlight module 102 and the micro-prism array 1032 or the Fresnel lens 1033 are spatially periodic structures, the light may cause Morie patterns after passing through the micro-prism array 1032 or the Fresnel lens 1033. However, when the light passes through the diffuser 1031, the periodicity of light is scattered, effectively suppressing or eliminating Moiré patterns. It should be noted that the HAZE of the diffuser module 1031 of the directional LCDs 3 and 4 should be less than 30%, or an FWHM of light energy distribution of the diffuser module 1031 of the directional LCDs 3 and 4 should be less than 20 degrees.

Figure 5:
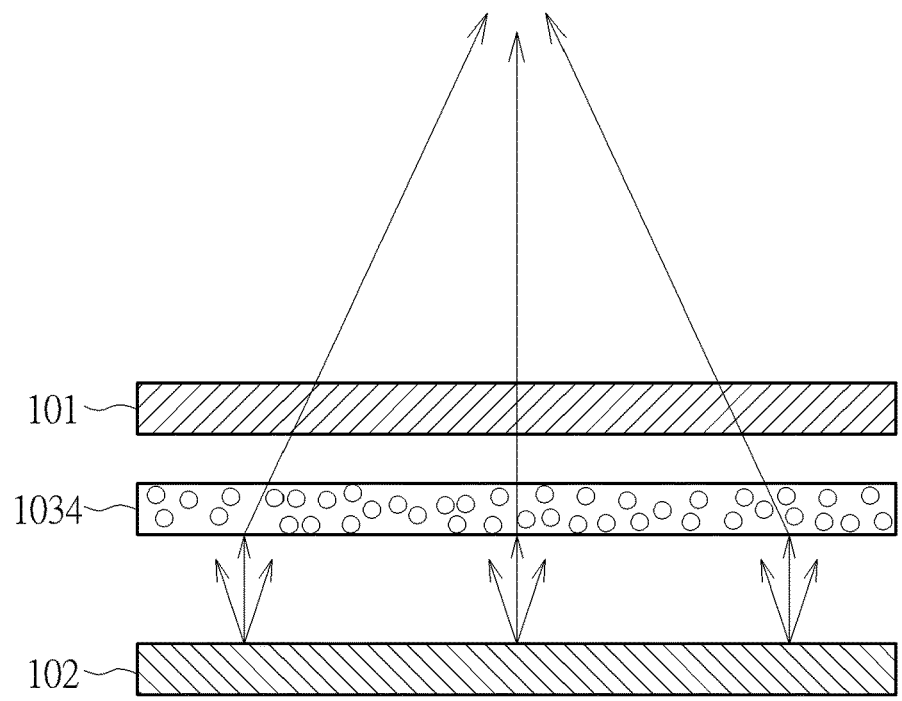
FIGS. 5 and 6 are schematic diagrams of directional liquid crystal displays according to embodiments of the present invention.
Figure 6:
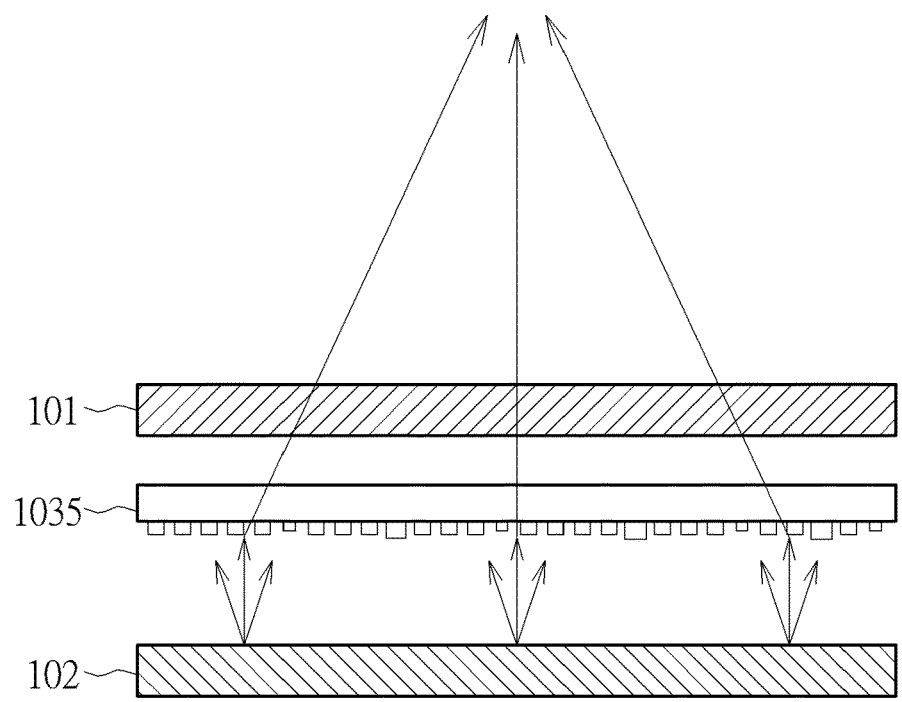

Please refer to FIG. 5 and FIG. 6. FIGS. 5 and 6 are schematic diagrams of directional LCDs 5 and 6, respectively, according to embodiments of the present invention. The light directional module 103 of the directional LCD 5 is a spatially aperiodic optical module, and implemented as a refractive index control optical module 1034, which may be a liquid crystal lens or a geometric phase lens. As a result, the light does not pass through two spatially periodic structures consecutively, effectively eliminating the occurrence of Moiré patterns. On the other hand, as shown in FIG. 6, the light directional module 103 is a meta surface lens module. It should be noted that a size of each lens in the meta surface lens is less than 1 micron, which is much smaller than the periodicity of the backlight module 102 or the liquid crystal module 101. Therefore, the light passing through the directional optical module 102 and the liquid crystal module 101 will not cause Moiré patterns.

In summary, the present invention addresses the issue of Moiré patterns in the directional LCDs by positioning the light directional module between the LCD module and the backlight module. This arrangement offers greater flexibility and customization, as the user can choose from a variety of light directional modules that suit the user's needs, without compromising vision comfort due to the elimination or suppression of Moiré patterns affecting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A directional liquid crystal display, capable of suppressing Moiré patterns, comprising:
    a liquid crystal display module;
    a backlight module with a small divergence angle, for emitting light toward the liquid crystal display module, wherein a full width at half maximum (FWHM) of light energy distribution of the backlight module is less than 50 degrees; and
    a light directivity module, disposed between the backlight module and the liquid crystal display module;
    wherein the light directivity module comprises a spatially periodic structure module and a diffuser module, wherein the spatially periodic structure module is adjacent to the backlight module and the diffuser module is adjacent to the liquid crystal display module.

2. The directional liquid crystal display of claim 1, wherein the backlight module comprises a direct back-lit backlight module and a condenser lens module.

3. The directional liquid crystal display of claim 1, wherein the backlight module comprises a direct back-lit backlight module and a privacy film module, a viewing control film module or a liquid crystal angular attenuator filter.

4. The directional liquid crystal display of claim 1, wherein a haze effect (HAZE) of the diffuser module is less than 30%, or an FWHM of light energy distribution of the diffuser module is less than 20 degrees.

5. The directional liquid crystal display of claim 1, wherein the spatially periodic structure module is a Fresnel lens or a micro-prism array.

6. The directional liquid crystal display of claim 1, wherein the spatially periodic structure module is a Fresnel lens or a micro-prism array with a spatially random arrangement structure.

7. The directional liquid crystal display of claim 1, wherein the light directivity module is a refractive index control optical module.

8. The directional liquid crystal display of claim 7, wherein the refractive index control optical module is a refractive index control liquid crystal lens or a geometric phase lens.

9. The directional liquid crystal display of claim 1, wherein the light directivity module is a meta surface lens.

10. The directional liquid crystal display of claim 9, wherein a size of each lens of the meta surface lens is less than 1 micron.

11. The directional liquid crystal display of claim 1, wherein the light directivity module is a spatially periodic optical module with a periodic structure on a scale of light wavelength.

12. The directional liquid crystal display of claim 11, wherein a side of the spatially periodic optical module adjacent to the backlight module has spatial periodicity, and a side of the spatially periodic optical module adjacent to the liquid crystal display module has diffuser characteristics.

13. The directional liquid crystal display of claim 12, wherein a haze effect (HAZE) of the diffuser characteristics is less than 30%.

* * * * *